May 14, 1929.  G. C. CROOM  1,712,552
SANITARY DRINKING GLASS
Filed April 4, 1928
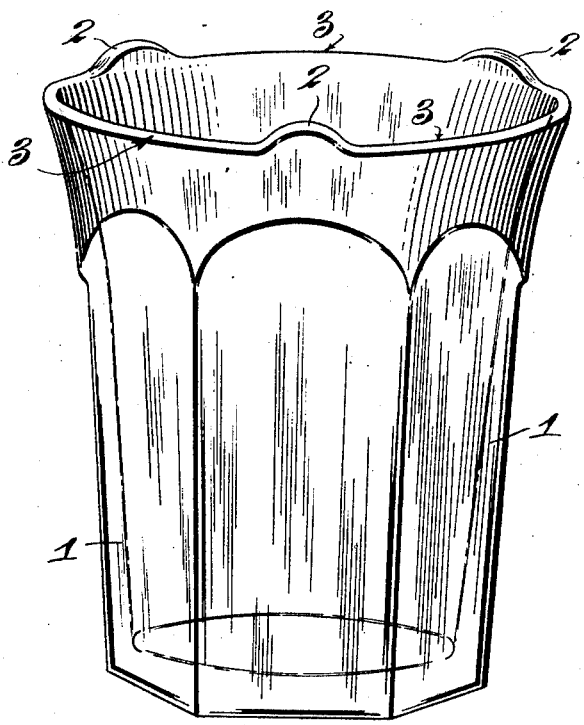
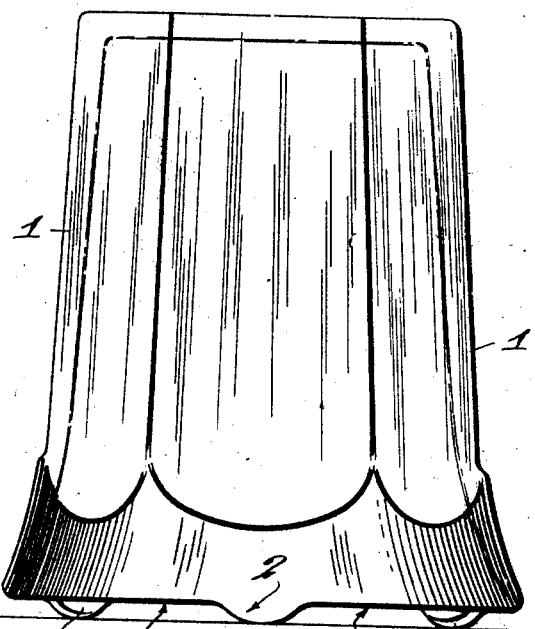
INVENTOR
G. C. Croom
BY
ATTORNEY Patented May 14, 1929.

1,712,552

UNITED STATES PATENT OFFICE.

GROVER C. CROOM, OF LITTLE ROCK, ARKANSAS.

SANITARY DRINKING GLASS.

Application filed April 4, 1928. Serial No. 267,307.

My invention relates to certain new and useful improvements in drinking glasses and it particularly has for its object to provide means to keep the edge or margin of the glass which comes in contact with the mouth while drinking, in a more sanitary way than is possible with glasses now in use.

Further, the invention has for its object to provide a drinking glass with a plurality (three or more) of elevations or points on its edge (the number depending upon the size of the glass) leaving sufficient space between each pair of elevations or points to place the mouth without coming in contact with any of the elevations or points.

Other objects will in part be obvious and in part be referred to hereinafter.

To the attainment of the aforesaid objects and ends the invention resides in those novel features of construction, combination and arrangement of parts all of which will hereinafter be fully described, then be particularly pointed out in the appended claim, reference being had to the accompanying drawing, in which:

Figure 1 is a perspective view of a glass embodying my invention.

Figure 2 is a side elevation of the glass inverted and resting upon a support.

In the drawing, in which like numerals of reference indicate like parts in all of the figures, 1 represents the glass from the mouth edge of which there projects a plurality of elevations or points 2 spaced sufficiently apart to leave portions 3 of the edge of the glass free and against which the mouth of the drinker may be placed without coming in contact with the projections or elevations 2.

The particular form or contour of the elevations 2 is not material to the invention nor is the number thereof, so long as there be three or more, so that the glass when inverted and set down will not have the portions 3 come in contact with the support. It is also essential that the elevations 2 be spaced far enough apart to allow the drinker to place his mouth on a portion 3 without coming in contact with the elevations or points 2.

From the foregoing description, taken in connection with the accompanying drawing, it is thought the construction and advantages of my invention will be readily clear to those skilled in the art.

What I claim is:

A drinking glass having at least three elevations or points projecting from its edge and spaced apart a sufficient distance to leave room for the mouth of the drinker to engage the edge of the glass between adjacent elevations without coming in contact therewith, those portions of the edge of the glass lying between adjacent elevations all lying in the same plane normal to the axis of the glass.

GROVER C. CROOM.